United States Patent [19]

Hockemeyer et al.

[11] Patent Number: 4,473,603
[45] Date of Patent: Sep. 25, 1984

[54] PROCESS FOR PREPARING ADHESIVE-REPELLENT COATINGS

[75] Inventors: Friedrich Hockemeyer, Emmerting; Gerhard Preiner, Burghausen, both of Fed. Rep. of Germany

[73] Assignee: Wacker-Chemie GmbH, Munich, Fed. Rep. of Germany

[21] Appl. No.: 577,740

[22] Filed: Feb. 9, 1984

Related U.S. Application Data

[63] Continuation of Ser. No. 366,493, Apr. 8, 1982, abandoned.

[30] Foreign Application Priority Data

Apr. 16, 1981 [DE] Fed. Rep. of Germany ....... 3115563

[51] Int. Cl.³ .................... B05D 3/02; C08G 77/06
[52] U.S. Cl. ........................... 427/387; 427/389.7; 427/389.8; 427/391; 427/393; 427/393.5; 427/393.6; 528/15; 528/31; 528/32
[58] Field of Search ............ 427/387, 391, 393, 393.5, 427/389.8, 393.6, 389.7; 528/15, 31, 32

[56] References Cited

U.S. PATENT DOCUMENTS

| | | | |
|---|---|---|---|
| 3,220,972 | 11/1965 | Lamoreaux | 260/46.5 |
| 3,445,420 | 5/1969 | Kookootsedes et al. | 528/15 X |
| 3,882,083 | 5/1975 | Berger et al. | 528/31 X |
| 4,260,726 | 4/1981 | Deubzer et al. | 528/15 |
| 4,347,346 | 8/1982 | Eckberg | 528/15 |
| 4,421,783 | 12/1983 | Marwitz et al. | 427/387 X |

Primary Examiner—Thurman K. Page

[57] ABSTRACT

Coatings which have a predetermined degree of adhesive-repellency are prepared by applying to surfaces which are to be rendered adhesive-repellent an organopolysiloxane having Si-bonded hydrogen and an aliphatic multiple bond in the same molecule and a catalyst which promotes the addition of Si-bonded hydrogen to an aliphatic multiple bond, and thereafter crosslinking the organopolysiloxane by the addition of Si-bonded hydrogen to an aliphatic multiple bond. The organopolysiloxane having both an aliphatic multiple bond and Si-bonded hydrogen in the same molecule, has a viscosity of at least 300 mPa.s at 25° C. The adhesive-repellency of the coated substrate is at least partially dependent on the ratio of Si-bonded hydrogen to the aliphatic multiple bond, i.e., the higher the ratio of Si-bonded hydrogen to the aliphatic multiple bond, the lower the adhesive-repellency.

Organic compounds containing at least one grouping of the formula

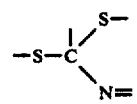

in an amount to retard or prevent the addition of Si-bonded hydrogen to an aliphatic multiple bond at room temperature, are to be excluded from the adhesive-repellent compositions of this invention.

11 Claims, No Drawings

PROCESS FOR PREPARING ADHESIVE-REPELLENT COATINGS

This is a continuation of application Ser. No. 366,493, filed Apr. 8, 1982 now abandoned.

The present invention relates to adhesive-repellent coatings and more particularly to a process for preparing adhesive-repellent coatings having a predetermined degree of repellency.

BACKGROUND OF THE INVENTION

Adhesive-repellent coatings having a controllable degree of adhesive-repellency have been described in U.S. Pat. No. 4,154,714 to Hockemeyer et al. These adhesive-repellent coatings are prepared by applying to the surfaces to be rendered adhesive-repellent a composition containing organopolysiloxanes having SiC-bonded groups which contain an aliphatic multiple bond, organopolysiloxanes having Si-bonded hydrogen and a catalyst which promotes the addition of Si-bonded hydrogen to an aliphatic multiple bond and thereafter crosslinking the organopolysiloxanes.

U.S. Pat. No. 4,260,726 to Deubzer et al describes thermosetting compositions containing organopolysiloxanes having Si-bonded hydrogen and aliphatic multiple bonds which can be crosslinked by the addition of the Si-bonded hydrogen to an aliphatic multiple bond in the presence of catalysts, such as platinum, and an additive which retards or prevents crosslinking at least at room temperature and consists at least partially of at least one organic compound having at least one group of the formula

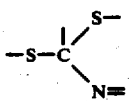

The patent further provides that the aliphatic multiple bond and Si-bonded hydrogen may be present in the same organo-silicon compound, in which the Si-bonded hydrogen is present in an amount of from 0.1 to 15 Si-bonded hydrogen atoms for each aliphatic multiple bond. These thermosetting organopolysiloxane compositions may be used in preparing coatings which repel adhesive substances. However, it should be emphasized that the compositions disclosed in U.S. Pat. No. 4,260,726 do not contain any provisions for regulating the degree of adhesive-repellency.

U.S. Pat. No. 4,043,977 to deMontigny et al describes a composition for preparing adhesive-repellent coatings which contain organopolysiloxanes having SiC-bonded vinyl groups, i.e., groups having an aliphatic multiple bond, and Si-bonded hydrogen in one and the same molecule, in which the organopolysiloxane contains up to 10 silicon atoms per molecule and a platinum complex. In contrast to the teachings of U.S. Pat. No. 4,043,977, the organopolysiloxanes having SiC-bonded groups which contain an aliphatic multiple bond and Si-bonded hydrogen in one and the same molecule used in the present invention, contain more than 10 silicon atoms per molecule. Moreover, this reference does not disclose a coating composition in which the degree of adhesive repellency is controlled.

Even though the adhesive properties of adhesives decrease when they are in contact with the coatings prepared in accordance with this invention over a prolonged period of time, the decrease is less than in comparable coatings known heretofore.

Therefore, it is an object of the present invention to provide coating compositions which will impart release properties to substrates coated therewith. Another object of this invention is to provide coating compositions which will impart non-adherent properties to substrates coated therewith when contacted with adhesive materials. Another object of this invention is to provide compositions which cure rapidly when applied to substrates. A further object of this invention is to provide coatings which have a predetermined degree of repellency when contacted with adhesive materials. A still further object of this invention is to provide a process for preparing adhesive-repellent coatings having a predetermined degree of repellency.

SUMMARY OF THE INVENTION

The foregoing objects and others which will become apparent from the following description are accomplished in accordance with this invention, generally speaking, by providing a proces for preparing adhesive-repellent coatings which comprises applying to a substrate a composition containing a catalyst which promotes the addition of Si-bonded hydrogen to an aliphatic multiple bond, an organopolysiloxane in which some of the molecules of the organopolysiloxane contains SiC-bonded aliphatic multiple bonds and Si-bonded hydrogen in the same molecule and has a viscosity of at least 300 mPa.s at 25° C., with the proviso that the composition does not contain an organic compound having at least one group of the formula

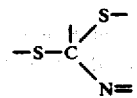

in an amount which will delay or retard the addition of Si-bonded hydrogen to an aliphatic multiple bond at room temperature and thereafter crosslinking the organopolysiloxane by the addition of Si-bonded hydrogen to aliphatic multiple bonds to form a coating on the substrate having a predetermined degree of adhesive-repellency.

DETAILED DESCRIPTION OF THE INVENTION

The organopolysiloxanes employed in this invention which contain SiC-bonded groups having an aliphatic multiple bond and an Si-bonded hydrogen in each molecule and a viscosity of at least 300 mPa.s at 25° C., are preferably represented by the following general formula:

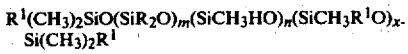

(I).

In the above formula R represents the same or different monovalent hydrocarbon radicals and substituted monovalent hydrocarbon radicals which are free of an aliphatic multiple bond, $R^1$ represents the same or different hydrocarbon radicals having an aliphatic multiple bond, m and n each represent an integer, x represents 0 or an integer, the sum of m+n+x always equals a value which is such that the average viscosity of the organopolysiloxanes of the above formula is at least 300 mPa.s at 25° C., with at least 3 Si-bonded hydrogen atoms being present per molecule and with the ratio of m:n being between 1:1 and 99:1 and with the ratio of th SiCH₃HO units, i.e. the methylhydrogensiloxane units, to the units having an R¹ group being from 5:1 to 50:1.

Organopolysiloxanes containing in each molecule Si-bonded hydrocarbon radicals with an aliphatic multiple bond as well as Si-bonded hydrogen and which have a viscosity of at least 300 mPa.s at 25° C. may also be represented by the following formulas:

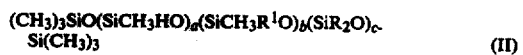  (II)

  (III)

  (IV)

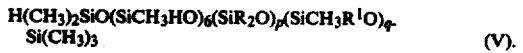  (V).

In these formulas, R and R¹ are the same as above, a, b, c, d, e, f, g, h, i, l, p and q each represent integers in which i may also represent 0.

In these formulas
a+b+c is at least 200,
d+e+f is at least 200,
g+h+i is at least 200 and
l+p+q is at least 200.

Also, it is preferred that at least 3 Si-bonded hydrogen atoms be present per molecule. The ratio of methylhydrogensioxane units to R¹ groups is preferably between 5:1 and 50:1.

The higher the ratio of Si-bonded hydrogen to the aliphatic multiple bond, the lower the adhesive repellency.

Although this is generally not shown in the formulas of this type, other siloxane units may also be present within or along the organopolysiloxane chains of the above formulas in addition to the SiCH₃HO, the SiR₂O and the optional SiCH₃R¹O units. Examples of such other siloxane units which are generally present only as impurities, are those of the formulas RSiO₃/₂, R₃SiO₁/₂ and SiO₄/₂ units where R is the same as above. Such other siloxane units preferably represent no more than 10 mole percent and, more preferably no more than about 1 mole percent of the units in the organopolysiloxanes of the above formula.

Examples of hydrocarbon radicals represented by R in the above formulas are alkyl radicals having from 1 to 18 carbon atoms, such as the methyl, ethyl, n-propyl, isopropyl, n-butyl and the sec-butyl radicals, as well as octadecyl radicals; cycloalkyl radicals having from 5 to 8 carbon atoms, such as the cyclohexyl and the cycloheptyl radicals, as well as the methylcyclohexyl radicals; aryl radicals such as the phenyl radical and xenyl radicals; alkaryl radicals, such as the tolyl radicals; and aralkyl radicals such as the benzyl and the beta-phenylethyl radicals.

Examples of substituted hydrocarbon radicals represented by R in the above formulas are especially halogenated hydrocarbon radicals, such as the 3,3,3-trifluoropropyl radical and o-, p- and m-chlorophenyl radicals.

Because of their availability, it is preferred that at least 50 percent and, more preferably, at least 90 percent of the R radicals be methyl radicals.

Examples of R¹ radicals are especially vinyl radicals, as well as allyl, acryloxy and methacryloxy radicals.

The compositions of this invention may be applied to substrates in the presence or absence of a solvent. However, for environmental reasons as well as the added cost of transportation and storage and the cost of removing the solvent as well as the dangers of an explosion, it is oftentimes preferred that the compositions be applied in the absence of a solvent. When a solvent is not employed, it is preferred that the organo-polysiloxanes containing both SiC-bonded groups having an aliphatic multiple bond and Si-bonded hydrogen in the same molecule have a viscosity of at least 300 mPa.s at 25° C., but not above about 5,000 mPa.s and, more preferably, a viscosity which does not exceed about 1,500 mPa.s at 25° C.

However, if solvents are used in the process of this invention, then the organopolysiloxanes having an SiC-bonded aliphatic multiple bond and Si-bonded hydrogen in the same molecule and a viscosity of at least 300 mPa.s at 25° C. may have viscosities in the range of from 5,000 mPa.s at 25° C. up to a value of about 10⁴ Nm, as determined in a Brabender Plastograph at 25° C. and at 60 rpm.

The organopolysiloxanes containing SiC-bonded groups having an aliphatic multiple bond and Si-bonded hydrogen in the same molecule and having a viscosity of at least 300 mPa.s at 25° C., may consist of only one type of copolymer or mixtures of copolymers or they may consist of mixtures of the same or different copolymers having various degrees of polymerization.

Thus, it is possible for use, for example, those polymers of formula (I) mixed with the polymers of formula (III).

The diorganosiloxane units and the methylhydrogensiloxane units may be present in a random distribution or they may be present in the form of block polymers.

Such compounds may, for example, be prepared by the equilibration of 1,3-divinyl-1,1,3,3-tetramethyldisiloxane with a copolymer consisting of dimethyldichlorosilane and methylhydrogendichlorosilane by any conventional process known in the art.

In this invention it is possible to use any catalyst which promotes the addition of Si-bonded hydrogen to an aliphatic multiple bond. Examples of such catalysts are metallic and finely dispersed metals such as platinum, ruthenium, rhodium, palladium and iridium, which may be present on solid carriers such as silicon dioxide, aluminum oxide or activated carbon, and compounds or complexes of these elements, such as PtCl₄, H₂PtCl₆.6H₂O, Na₂PtCl₄.4H₂O, platinum-olefin complexes, platinum-alcohol or platinum-alcoholate complexes, platinum-ether complexes, platinum-aldehyde complexes, platinum-ketone complexes, including reaction products of H₂PtCl₆.6H₂O and cyclohexanone, platinum-vinylsiloxane complexes, especially platinum-divinyl-tetramethyldisiloxane complexes which contain or are free of traceable amounts of inorganic bonded halogen, bis-(gammapicoline)-platinum dichloride, trimethylenepyridine platinum dichloride, dicyclopentadiene platinum dichloride and dimethylsulfoxide-ethylene-platinum(II)-dichloride as well as the reaction products of platinum tetrachloride dissolved in 1-octene and sec-butylamine.

Platinum compounds or platinum complexes which promote the addition of Si-bonded hydrogen to an aliphatic multiple bond are the preferred catalysts in this invention.

It is possible to use only one catalyst which promotes the addition of Si-bonded hydrogen to an aliphatic multiple bond, or a mixture of two or more such catalysts may be employed.

If a platinum compound or a platinum complex is used as a catalyst to promote the addition of Si-bonded hydrogen to an aliphatic multiple bond, then the catalyst is preferably employed in an amount of from 10 to 100 ppm by weight (parts per million by weight), and especially at the rate of from 20 to 50 ppm, based on elemental platinum and based on the total weight of the organopolysiloxane used.

In order to ensure adequate stability of the compounds used in the process of this invention, they may contain in addition to the previously mentioned components, at least one agent which delays or retards the addition of Si-bonded hydrogen to an aliphatic multiple bond at room temperature, except that the agent may not contain any organic compounds containing one or more of the following groups

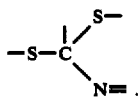

Examples of such agents are secondary or tertiary acetylenic alcohols, such as ethinylcyclohexanol and 2-methyl-3-butine-2-ol; as well as benzotriazole, triphenylphosphine, stannous and mercury salts, as well as methylethylketoxime, 1,3-divinyl-1,1,3,3-tetramethyldisiloxane and trichloroethylene.

The agents which are used to delay or impede the addition of Si-bonded hydrogen to an aliphatic multiple bond at room temperature, are preferably employed in amounts of from 0.5 to 10 parts per thousand by weight and more preferably from 1 to 5 parts per thousand by weight, based on the total weight of the organopolysiloxane present.

In addition to the organopolysiloxane containing SiC-bonded groups having an aliphatic multiple bond and Si-bonded hydrogen in the same molecule and having a viscosity of at least 300 mPa.s at 25° C., it is possible to use in the process of this invention the same type of organopolysiloxanes having a lower viscosity, in which the organopolysiloxanes contain Si-bonded hydrogen as the only reactive constituent, such as, for example methylhydrogenpolysiloxanes which are endblocked by trimethylsiloxy groups, or organopolysiloxanes containing SiC-bonded groups having an aliphatic multiple bond. Examples of such organopolysiloxanes are those previously mentioned having $R^1$ as the only reactive constituent, such as dimethylpolysiloxanes containing vinyldimethylsiloxy terminal groups. These organopolysiloxanes preferably have at least the same viscosity as the organopolysiloxanes having an aliphatic multiple bond and Si-bonded hydrogen in the same molecule and a viscosity of at least 300 mPa.s at 25° C., or mixtures of two or more different types of such organopolysiloxanes.

Solvents which may be used in the process of this invention are the same solvents which could have been used heretofore in processes for preparing adhesive-repellent coatings by applying to the surface to be rendered adhesive-repellent, an organopolysiloxane and a catalyst which promotes the addition of Si-bonded hydrogen to an aliphatic multiple bond and thereafter crosslinking the organopolysiloxane by the addition of Si-bonded hydrogen to an aliphatic multiple bond. Examples of such solvents are ligroin, which consists of alkane mixtures with a boiling range of from 80° to 110° C. at 1013 mbar (absolute), benzene, toluene and xylenes, halogenated alkanes having from 1 to 6 carbon atoms, such as methylene chloride, trichloroethylene and perchloroethylene; ethers such as di-n-butylether, esters such as ethyl acetate and ketones such as methyl ethyl ketone and cyclohexanone.

Although the use of organic solvents is optional, when the solvents are used, they are preferably used in an amount of from 2.5 to 20 percent by weight and more preferably from 5 to 10 percent by weight.

When the compositions used in accordance with this invention are employed at least substantially free of solvents, then they are preferably applied in amounts which do not exceed about 0.6 g/m².

Compositions may be applied to the surfaces which are to be made adhesive-repellent by any method which has been or could have been used heretofore to coat the surfaces, such as, for example by immersion, coating, pouring, spraying, calendering, printing, e.g., with an off-set gravure coating machine, with a knife or a Meyer rod, or with the aid of an airbrush. If an off-set gravure coating machine is used, for example, a screen calendering system, the substrate whose surface is to be made adhesive-repellent, may run at a higher speed than the molded cylinder.

Any surface may be coated with the compositions of this invention to impart adhesive-repellency thereto. Examples of such surfaces are paper, such as kraft paper or imitation parchment paper, fiberglass, wood, cork, plastic foils, for example polyethylene foil or polypropylene foil, woven or nonwoven fabric made of natural or synthetic fibers or glass fibers, ceramic objects, glass, metals, polyethylene-coated kraft paper and cardboard, including asbestos board. The polyethylene mentioned above may consist of high pressure, medium or low pressure polyethylene.

The crosslinking of the organopolysiloxane through the addition of Si-bonded hydrogen to an aliphatic multiple bond may be achieved by heating to a temperature of preferably from 100° to 180° C. Heating can also be achieved by infrared radiation.

Crosslinking may also be achieved by ultraviolet light, in which case the composition of this invention must also contain at least one photosensitizer such as benzophenone, unless the catalyst used for promoting the addition of Si-bonded hydrogen to an aliphatic multiple bond is already a photosensitizer.

In most cases, crosslinking periods of from 4 to 50 seconds are sufficient to obtain crosslinked coatings without blocking.

In the following examples, all parts are by weight, unless otherwise specified.

The platinum complex-diluent mixture used as a catalyst in the following examples was prepared as follows:

About 20 parts of sodium bicarbonate were added to a mixture containing 10 parts of $H_2PtCl_6.6H_2O$, 20 parts of 1,3-divinyl-1,1,3,3-tetramethyldisiloxane and 50 parts of ethanol. The mixture was refluxed for 30 minutes, then allowed to stand for 15 hours and subsequently filtered. The volatile components were distilled from the filtrate at about 16 mbar. The residue was then dissolved in benzene, then filtered and the benzene then distilled off the filtrate. The residue was then dissolved in a dimethylpolysiloxane containing vinyldimethylsiloxy terminal groups and having a viscosity of 1,000 mPa.s at 25° C., in an amount such that the solution contained 1 percent platinum, calculated as elemental platinum.

EXAMPLE 1

To 90 parts of a dimethylpolysiloxane containing vinyldimethylsiloxy terminal groups and having a viscosity of 500 mPa.s at 25° C., are added 10 parts of a copolymer consisting of vinyldimethylsiloxane, methylhydrogensiloxane and dimethylsiloxane units with a viscosity of 755 mPa.s at 25° C., so that the ratio of methylhydrogensiloxane units to dimethylsiloxane units is 0.7:1.0. This mixture is then mixed with 0.2 parts of 2-methyl-3-butinol-2 and 0.6 parts of the platinum complex-diluent catalyst mixture prepared above.

Following the periods of time shown in Table 1, the mixture obtained is applied to bleached and polyvinyl alcohol coated kraft paper with the aid of a stainless steel rod on which a 0.2 mm thick stainless steel wire has been wound. The coated paper is then heated for 8 seconds at 150° C. in a circulating air oven. The coating weighs approximately 4 g/m². Immediately after the coated paper has been removed from the circulating air oven, pressure-sensitive paper is applied to the coated side in the form of a 2 cm wide adhesive band ("Tesa-film red No. 154", manufactured by Beiersdorf AG, Hamburg, "Tesa" is a registered trademark). The adhesive band is applied with the aid of a rubber roller with a pressure of 20N. After heating for 20 hours at 70° C. under a load of 0.2N/cm², the adhesive band is removed from the paper at a temperature of 20° C., at an angle of 180° and at a rate of 15 cm/minute. The force required to remove the adhesive band is shown in the Table as the "separation factor".

(I) The adhesive bands which have been removed from the organopolysiloxane-coated paper are applied to an untreated acetate foil with a rubber roller with the same pressure with which they were previously applied to the coated paper. The force required for their removal under the previously indicated conditions is also measured.

(II) An adhesive band of the type described above is applied to untreated acetate foil with a rubber roller and with the same pressure with which it was previously pressed onto the coated paper. After heating for 20 hours at 70° C. under the same pressure which was previously applied in connection with the coated paper, the adhesive band is removed under the same conditions as described above. The force required for its removal is referred to as the "blind factor".

The factor referred to as "residual adhesion" in the following Tables is calculated as follows:

$$\frac{\text{(Force, measured according to I)} \times 100}{\text{Blind factor II}}$$

TABLE 1

| Time elapsed between preparation of mixture and application to paper Hours | Separation factor mN/mm | Residual adhesion, percent |
|---|---|---|
| 0 | 5.9 | 93 |
| 1 | 4.0 | 88 |
| 2 | 5.4 | 100 |
| 3 | 4.8 | 91 |
| 4 | 4.3 | 95 |
| 5 | 4.8 | 98 |

TABLE 1-continued

| Time elapsed between preparation of mixture and application to paper Hours | Separation factor mN/mm | Residual adhesion, percent |
|---|---|---|
| 7 | 5.6 | 98 |
| 8 | 4.2 | 86 |
| 24 | 4.5 | 97 |

EXAMPLE 2

The procedure described in Example 1 is repeated, except that 80 parts of the dimethylpolysiloxane containing vinyldimethylsiloxy terminal groups is substituted for the 90 parts of the dimethylpolysiloxane containing vinyldimethylsiloxy terminal groups and 20 parts of the copolymer consisting of vinyldimethylsiloxane, methylhydrogensiloxane and dimethylsiloxane units are used. The results are shown in Table 2.

TABLE 2

| Time elapsed between preparation of mixture and application to paper Hours | Separation factor mN/mm | Residual adhesion, percent |
|---|---|---|
| 0 | 32.0 | 93 |
| 1 | 20.0 | 100 |
| 2 | 30.2 | 100 |
| 3 | 23.8 | 93 |
| 4 | 20.0 | 94 |
| 6 | 22.9 | 100 |
| 7 | 16.1 | 89 |
| 8 | 19.9 | 95 |
| 24 | 28.1 | 88 |

COMPARISON EXAMPLE

The procedure described in Example 1 was repeated, except that 100 parts of the dimethylpolysiloxane having vinyldimethylsiloxy groups was used and 3 parts of a copolymer consisting of trimethylsiloxane, methylhydrogensiloxane and dimethylsiloxane units having 1.36 percent of Si-bonded hydrogen, and a viscosity of approximately 70 mPa.s at 25° C. was substituted for the 10 parts of the copolymer containing vinyldimethylsiloxane, methylhydrogensiloxane and dimethylsiloxane units. The results are shown in Table 3.

TABLE 3

| Time elapsed between preparation of mixture and application to paper Hours | Separation factor mN/mm | Residual adhesion, percent |
|---|---|---|
| 0 | 0.9 | 95 |
| 4 | 1.5 | 98 |
| 24 | 2.1 | 98 |

EXAMPLE 3

Coatings which were applied to bleached polyvinyl alcohol coated kraft paper as described in Examples 1 and 2 as well as in the Comparison Example were tested with adhesives other than the adhesive band described in detail in Example 1. Table 4 shows the results.

TABLE 4

|  | Example 1 Separation factor mN/mm | Example 2 Separation factor mN/mm | Comparison Example Separation factor mN/mm |
|---|---|---|---|
| Tesa 970 | 37.0 | 93.0 | 8.0 |
| Tesa 171 | 10.4 | 49.2 | 1.6 |
| Acrylresin adhesive from solution | 37.8 | 67.2 | 2.9 |

EXAMPLE 4

(a) About 33 parts of a diorganopolysiloxane having vinyldimethylsiloxy terminal groups which consists of 99.5 mole percent of dimethylsiloxane units and 0.5 mole percent of vinylmethylsiloxane units and having a viscosity of 4,000 Nm (determined in a Brabender Plastograph at 25° C. and 60 rpm) are dissolved in 67 parts of toluene. To this solution are added 0.25 percent of 2-methyl-3-butinol-2, based on the weight of the organopolysiloxane.

(b) About 33 parts of the copolymer described in Example 1, which consists of vinyldimethylsiloxane, methylhydrogensiloxane and dimethylsiloxane units, are dissolved in 67 parts of a xylene isomer mixture. About 0.25 percent by weight of 2-methyl-3-butinol-2, based on the weight of the organopolysiloxane is added to the solution.

The solution prepared in Example 4(a) above is mixed with the solution prepared in Example 4(b) above, in the proportions shown in Table 5. After being diluted with an alkane mixture having a boiling range of from 80° to 110° C. at 1013 mbar (abs.) so that the organopolysiloxane is present in an amount of 5 percent, the resultant solutions are mixed with a sufficient amount of the platinum complex-diluent catalyst mixture described above so that they contain 50 ppm of platinum, based on the elemental platinum and the siloxane.

With the aid of a stainless steel rod which is surrounded by a 0.2 mm thick stainless steel wire, the solutions are then applied to calendered imitation parchment paper at the rate of approximately 10 g of solution per square meter. This application takes place either immediately or after the time periods shown in Table 5. The coated paper obtained is then heated for 7 seconds at 140° C. in a circulating air oven and then tested in accordance with the procedure described in Example 1.

TABLE 5

| Time elapsed between preparation of solution mixtures and application to paper Hours | Solution (a):Solution (b) 10:2 | | Solution (a):Solution (b) 8:4 | |
|---|---|---|---|---|
|  | Separation factor mN/mm² | Residual adhesion, percent | Separation factor mN/mm² | Residual adhesion, percent |
| 0 | 7.5 | 96 | 13.6 | 100 |
| 1 | 6.9 | 88 | 15.5 | 95 |
| 2 | 7.2 | 93 | 18.3 | 94 |
| 3 | 9.3 | 90 | 16.2 | 87 |
| 4 | 8.8 | 91 | 11.8 | 84 |
| 5 | 7.7 | 94 | 13.9 | 84 |
| 6 | 8.0 | 85 | 16.2 | 93 |
| 7 | 8.8 | 89 | 13.5 | 90 |
| 8 | 8.9 | 93 | 12.3 | 92 |
| 24 | 8.0 | 98 | 12.0 | 89 |

EXAMPLE 5

About 100 parts of a dimethylpolysiloxane having vinyldimethylsiloxy terminal groups and having a viscosity of 500 mPa.s at 25° C. are mixed with 20 parts of a copolymer containing vinyldimethylsiloxane, methylhydrogensiloxane and dimethylsiloxane units, and having a viscosity of 828 mPa.s at 25° C., with a molar ratio of methylhydrogensiloxane units to dimethylsiloxane units of 1:1. About 100 parts of the mixture thus obtained which has a viscosity of 568 mPa.s at 25° C. are then mixed with 0.25 parts of 2-methyl-3-butinol-3, 0.5 parts of benzophenone and 0.4 parts of the platinum complex-diluent catalyst mixture prepared above.

Using a continuously operating multi-roller system, the mixture is then applied to 80 cm wide supercalendered kraft paper at a rate of 0.4 to 0.6 g/m² which runs at the rate of 2 m²/minute per 1 KW of power under 2 ultraviolet lamps (IT mercury flash lamps, manufactured by Hildebrade) with an available power of 5 KW per lamp, which are mounted at a distance of 20 cm from the paper. The results are shown in Table 6.

TABLE 6

| Adhesive | Adhesion factor mN/mm | Residual adhesion, percent |
|---|---|---|
| Tesa 104 | 7.2 | 96 |
| Tesa 154 | 7.9 | 82 |
| Tesa 658* | 12.5 | 98 |
| Tesa 970 | 12.3 | 96 |
| Acrylresin adhesive from toluene | 100 | 98 |

*Heated for 20 hours at 55° C. instead of 70° C. ["Tesa" is a Registered Trademark].

In the above tests, amounts greater than 0.6 g/m² were applied using a laboratory-type application process instead of a conventional coating machine.

What is claimed is:

1. An adhesive-repellent composition which may be applied to a substrate to form a coating thereon having a predetermined degree of adhesive-repellency which comprises a catalyst which promotes the addition of Si-bonded hydrogen to an aliphatic multiple bond and an organopolysiloxane in which part of the organopolysiloxane consists of an organopolysiloxane having a viscosity of at least 300 mPa.s at 25° C. and contains both SiC-bonded aliphatic multiple bonds and Si-bonded hydrogen in the same molecule, in which the ratio of Si-bonded hydrogen containing siloxane units to SiC-bonded aliphatic multiple bonded siloxane units is between 5:1 and 50:1, with the proviso that an organic compound having at least one group of the formula

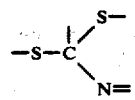

is not present in the composition in such an amount that it will retard or delay the addition of Si-bonded hydrogen to an aliphatic multiple bond at room temperature.

2. The composition of claim 1, wherein the organopolysiloxane having both SiC-bonded aliphatic multiple bonds and Si-bonded hydrogen in the same molecule is represented by the formula

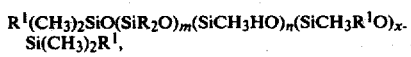

where R is selected from the group consisting of monovalent hydrocarbon radicals and substituted monovalent hydrocarbon radicals which are free of aliphatic multiple bonds; $R^1$ is a hydrocarbon radical having an aliphatic multiple bond; m and n represent integers, x is 0 or an integer, and the sum of m+n+x is a value in which the average viscosity of the organopolysiloxane is at least 300 mPa.s at 25° C., with at least 3 Si-bonded hydrogen atoms being present per molecule and the ratio of m:n being between 1:1 and 99:1, and the ratio of the SiCH₃HO units to the units having an $R^1$ group being between 5:1 and 50:1.

3. The composition of claim 1, wherein the organopolysiloxane having both SiC-bonded aliphatic multiple bonds and Si-bonded hydrogen in the same molecule is represented by the formula

(CH₃)₃SiO(SiCH₃HO)$_a$(SiCH₃R¹O)$_b$(SiR₂O)$_c$-Si(CH₃)₃ wherein R is selected from the group consisting of monovalent hydrocarbon radicals and substituted monovalent hydrocarbon radicals, which are free of aliphatic multiple bonds, $R^1$ is a hydrocarbon radical having an aliphatic multiple bond, a, b and c are each integers with the sum of a+b+c being at least 200, and at least 3 Si-bonded hydrogen atoms are present per molecule, with the ratio of SiCH₃HO units to the units having an $R^1$ group being between 5:1 and 50:1.

4. The composition of claim 1, wherein the organopolysiloxane having both SiC-bonded aliphatic multiple bonds and Si-bonded hydrogen in the same molecule is represented by the formula

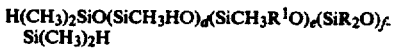
H(CH₃)₂SiO(SiCH₃HO)$_d$(SiCH₃R¹O)$_e$(SiR₂O)$_f$-Si(CH₃)₂H wherein R is selected from the group consisting of monovalent hydrocarbon radicals and substituted monovalent hydrocarbon radicals, which are free of aliphatic multiple bonds, $R^1$ is a hydrocarbon radical having an aliphatic multiple bond, d, e and f are each integers with the sum of d+e+f being at least 200, and at least 3 Si-bonded hydrogen atoms are present per molecule, with the ratio of SiCH₃HO units to the units having an $R^1$ group being between 5:1 and 50:1;

5. The composition of claim 1, wherein the organopolysiloxane having both SiC-bonded aliphatic multiple bonds and Si-bonded hydrogen in the same molecule is represented by the formula

R¹(CH₃)₂SiO(SiCH₃HO)$_g$(SiR₂O)$_h$(SiCH₃-R¹O)$_i$Si(CH₃)₂H wherein R is selected from the group consisting of monovalent hydrocarbon radicals and substituted monovalent hydrocarbon radicals, which are free of aliphatic multiple bonds, $R^1$ is a hydrocarbon radical having an aliphatic multiple bond, g and h are each integers, i is 0 or an integer with the sum of g+h+i being at least 200, and at least 3 Si-bonded hydrogen atoms are present per molecule with the ratio of SiCH₃HO units to the units having an $R^1$ group being between 5:1 and 50:1.

6. The composition of claim 1, wherein the organopolysiloxane having both SiC-bonded aliphatic multiple bonds and Si-bonded hydrogen in the same molecule is represented by the formula

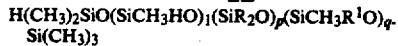
H(CH₃)₂SiO(SiCH₃HO)$_l$(SiR₂O)$_p$(SiCH₃R¹O)$_q$-Si(CH₃)₃ wherein R is selected from the group consisting of monovalent hydrocarbon radicals and substituted monovalent hydrocarbon radicals, which are free of aliphatic multiple bonds, $R^1$ is a hydrocarbon radical having an aliphatic multiple bond, l, p and q are each integers with the sum of l+p+q being at least 200 and at least 3 Si-bonded hydrogen atoms are present per molecule with the ratio of SiCH₃HO units to the units having an $R^1$ group being between 5:1 and 50:1.

7. A process for preparing an adhesive-repellent coating which comprises applying to a substrate to be rendered adhesive-repellent a composition containing an organopolysiloxane and a catalyst which promotes the addition of Si-bonded hydrogen to an aliphatic multiple bond in which part of the organopolysiloxane consists of an organopolysiloxane having a viscosity of at least 300 mPa.s at 25° C., and contains both SiC-bonded groups having an aliphatic multiple bond and an Si-bonded hydrogen in the same molecule, in which the ratio of Si-bonded hydrogen containing siloxane units to SiC-bonded aliphatic multiple bonded siloxane units is between 5:1 and 50:1, with the proviso that an organic compound having at least one group of the formula

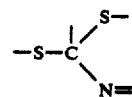

is not present in the composition in such an amount that it will retard the addition of Si-bonded hydrogen to an aliphatic multiple bond at room temperature and thereafter crosslinking the organopolysiloxane by the addition of Si-bonded hydrogen to an aliphatic multiple bond.

8. The process of claim 7, wherein the organopolysiloxane having a viscosity of at least 300 mPa.s at 25° C. and containing SiC-bonded groups having an aliphatic multiple bond and an Si-bonded hydrogen in the same molecule is represented by the formula

R¹(CH₃)₂SiO(SiR₂O)$_m$(SiCH₃HO)$_n$(SiCH₃R¹O)$_x$-Si(CH₃)₂R¹, where R is selected from the group consisting of monovalent hydrocarbon radicals and substituted monovalent hydrocarbon radicals which are free of aliphatic multiple bonds; $R^1$ is a hydrocarbon radical having an aliphatic multiple bond; m and n represent integers, x is 0 or an integer, and the sum of m+n+x is a value in which the average viscosity of the organopolysiloxane is at least 300 mPa.s at 25° C., with at least 3 Si-bonded hydrogen atoms being present per molecule and the ratio of m:n being between 1:1 and 99:1, and the ratio of the SiCH₃HO units to the units having an $R^1$ group being between 5:1 and 50:1.

9. An adhesive-repellent composition which may be applied to a substrate to form a coating thereon having a predetermined degree of adhesive-repellency consisting essentially of a catalyst which promotes the addition of Si-bonded hydrogen to an aliphatic multiple bond and an organopolysiloxane in which part of the organopolysiloxane consists of an organopolysiloxane having a viscosity of at least 300 mPa.s at 25° C. and contains both SiC-bonded aliphatic multiple bonds and Si-bonded hydrogen in the same molecule, in which the ratio of Si-bonded hydrogen containing siloxane units to SiC-bonded aliphatic multiple bonded siloxane units is between 5:1 and 50:1, and an inhibitor other than an organic compound having at least one group of the formula

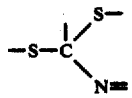

which will retard or delay the addition of Si-bonded hydrogen to an aliphatic multiple bond at room temperature.

10. An adhesive-repellent composition which may be applied to a substrate to form a coating thereon having a predetermined degree of adhesive repellency consisting essentially of a catalyst which promotes the addition of Si-bonded hydrogen to an aliphatic multiple bond and an organopolysiloxane in which part of the organopolysiloxane consists of an organopolysiloxane having a viscosity of at least 300 mPa.s at 25° C., and contains both SiC-bonded groups having an aliphatic multiple bond and an Si-bonded hydrogen in the same molecule, in which the ratio of Si-bonded hydrogen containing siloxane units to SiC-bonded aliphatic multiple bonded siloxane units is between 5:1 and 50:1, and an organic solvent, with the proviso that an organic compound having at least one group of the formula

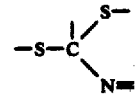

is not present in the composition in such an amount that it will retard the addition of Si-bonded hydrogen to an aliphatic multiple bond.

11. The composition of claim 9, wherein the composition contains an organic solvent.

* * * * *